United States Patent
Newton et al.

(10) Patent No.: US 9,053,828 B2
(45) Date of Patent: Jun. 9, 2015

(54) NUCLEAR REACTOR BOTTOM-MOUNTED INSTRUMENTATION NOZZLE REPAIR METHOD

(71) Applicant: Westinghouse Electric Company LLC, Cranberry Township, PA (US)

(72) Inventors: Bruce R. Newton, Fort Mill, SC (US); Mihai A. Pelle, Baisy-Thy (BE)

(73) Assignee: Westinghouse Electric Company LLC, Cranberry Township, PA (US)

( * ) Notice: Subject to any disclaimer, the term of this patent is extended or adjusted under 35 U.S.C. 154(b) by 570 days.

(21) Appl. No.: 13/792,638

(22) Filed: Mar. 11, 2013

(65) Prior Publication Data
US 2014/0123456 A1    May 8, 2014

Related U.S. Application Data

(60) Provisional application No. 61/723,430, filed on Nov. 7, 2012.

(51) Int. Cl.
*G21C 19/20* (2006.01)
*G21C 13/036* (2006.01)
G21C 13/06 (2006.01)

(52) U.S. Cl.
CPC ........... *G21C 13/036* (2013.01); *Y10T 29/4973* (2015.01); *Y10T 29/49718* (2015.01); *Y10T29/49352* (2015.01); *Y10T 29/49721* (2015.01); *G21C 13/06* (2013.01); *G21C 19/207* (2013.01); *Y02E 30/40* (2013.01)

(58) Field of Classification Search
CPC ...... G21C 13/06; G21C 3/334; G21C 13/036; G21C 19/207; Y10T 29/49718; Y10T 29/49728; Y10T 29/4973; Y10T 29/49734; Y10T 29/49352; Y10T 29/49721; Y10T 29/49726
See application file for complete search history.

(56) References Cited

U.S. PATENT DOCUMENTS

| | | | |
|---|---|---|---|
| 4,135,552 A | 1/1979 | Mendolia | |
| 4,255,840 A | 3/1981 | Loch et al. | |
| 5,404,382 A * | 4/1995 | Russ et al. | 376/260 |
| 5,483,560 A * | 1/1996 | Potz et al. | 376/250 |
| 5,605,361 A * | 2/1997 | Sims | 285/206 |
| 5,661,767 A * | 8/1997 | Roux | 376/260 |
| 5,918,911 A | 7/1999 | Sims | |
| 2007/0121776 A1* | 5/2007 | Pao | 376/305 |

FOREIGN PATENT DOCUMENTS

WO    2007/063401 A1    6/2007

OTHER PUBLICATIONS

International Search Report for PCT/US2013/037709 dated Sep. 20, 2013 (Form PCT/ISA/210).
Written Opinion of the International Searching Authority for PCT/US2013/037709 dated Sep. 20, 2013 (Form PCT/ISA/237).
Bottom-mounted Instrumentation Inspection and Repair, Datasheet [online], Westinghouse Nuclear, Oct. 2005 [retrieved on Aug. 22, 2013]. Retrieved from the Internet: http://westinghousenuclear.com/Products_&_Services/docs/flysheets/NS-ES-0059.pdf.

* cited by examiner

*Primary Examiner* — Sarang Afzali
*Assistant Examiner* — Ruth G Hidalgo-Hernande
(74) *Attorney, Agent, or Firm* — Richard J. Coldren; Westinghouse Electric Company LLC

(57) ABSTRACT

A method for removing and replacing a bottom-mounted instrumentation nozzle on a nuclear reactor pressure vessel. The method (i) caps or plugs the existing bottom-mounted instrumentation nozzle; (ii) cuts the nozzle at or near the nozzle to in-core instrument tube weld; (iii) installs a water-tight sealing enclosure outside the vessel over the bottom of the bottom-mounted instrumentation nozzle creating a water-tight seal with the underside of the reactor vessel; (iv) cuts to sever the existing bottom nozzle from the reactor vessel; (v) extracts the existing nozzle; (vi) installs a replacement alloy 690 nozzle or plug from inside the vessel; and (vii) welds the replacement nozzle or plug in place. The replacement bottom-mounted instrumentation nozzle incorporates an integral shoulder that prevents ejection during operation and facilitates installation, and the entire method is performed while the reactor pressure vessel is filled with water.

20 Claims, 4 Drawing Sheets

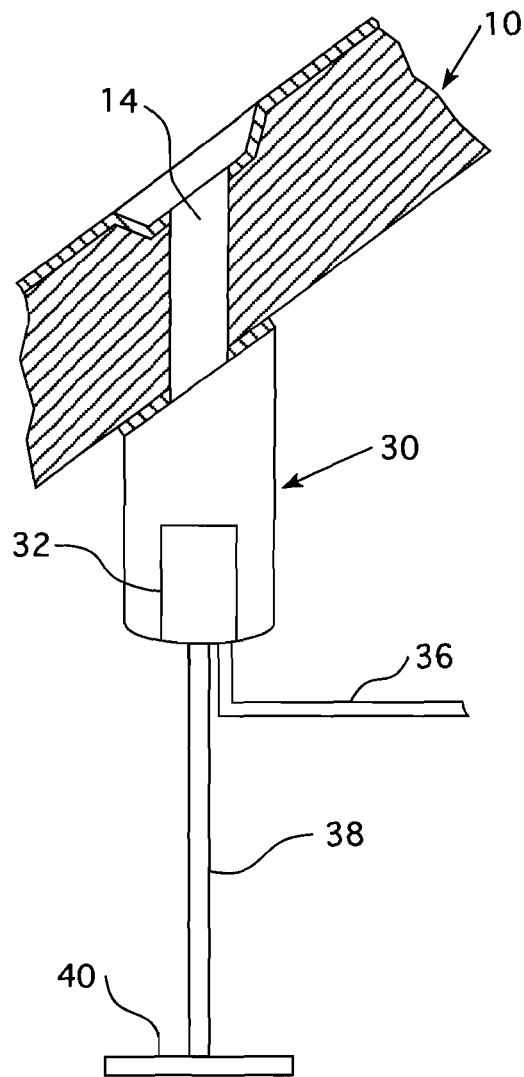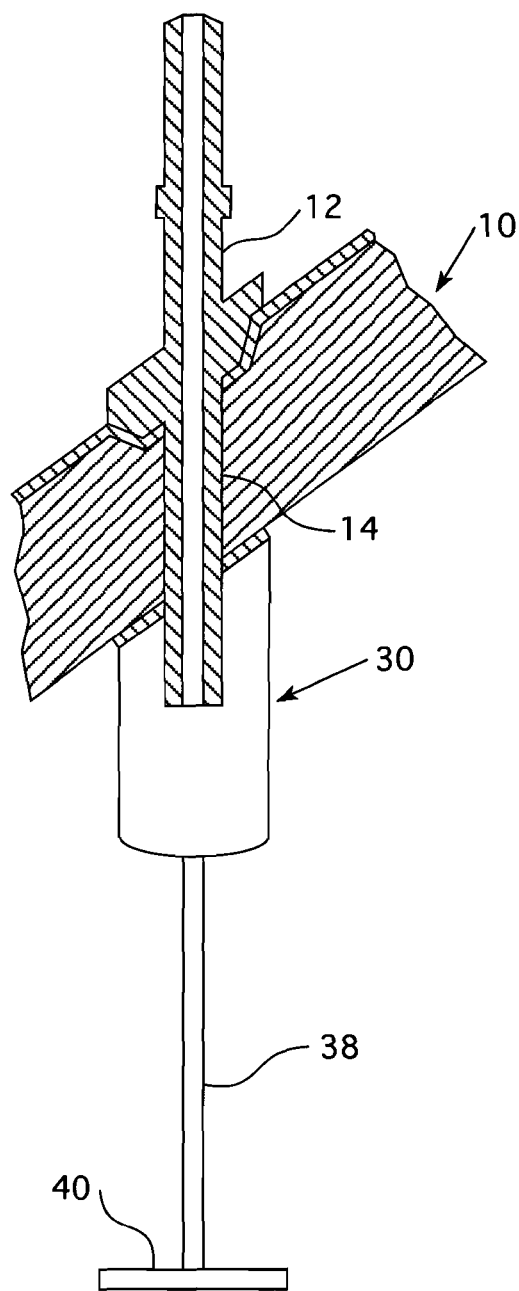

NUCLEAR REACTOR BOTTOM-MOUNTED INSTRUMENTATION NOZZLE REPAIR METHOD

CROSS REFERENCE TO RELATED APPLICATION

This application claims priority under 35 U.S.C. §119(e) from Provisional Application Ser. No. 61/723,430 entitled "BMI Nozzle Repair Method," filed Nov. 7, 2012.

BACKGROUND

1. Field

This invention generally pertains to the repair of cracks in and/or the repair/replacement of crack-susceptible materials in sealed penetrations in a pressure vessel and more particularly to the repair of bottom-mounted instrumentation nozzles in nuclear reactors.

2. Related Art

Cracks in alloy 600 material are commonly experienced in operating nuclear power plants and are prevalent when the alloy 600 materials are directly exposed to primary coolant. Alloy 600 material cracking has forced the industry to develop a variety of repair and replacement options that mitigate these conditions. Alloy 600 bottom mounted instrumentation nozzles and their associated installation welds (J-welds) are in direct contact with the primary coolant water and are known to be crack susceptible.

Because bottom mounted instrumentation nozzles are located at the bottom of the reactor pressure vessel, bottom mounted instrumentation nozzle repair or replacement poses considerable challenges. These challenges include high radiation levels, restricted access to the J-weld (i.e., access from inside the vessel) and restricted access to the bottom mounted instrumentation-to-in-core instrumentation weld in the in-core instrumentation pit (i.e., access from outside and beneath the vessel). Because bottom mounted instrumentation nozzle repairs must be accomplished with the reactor pressure vessel internals removed, the reactor pressure vessel must remain filled with water during any repair efforts; this water level serves to keep the highly radioactive reactor pressure vessel internals, which are stored adjacent to the reactor pressure vessel in the refueling pool, under water. Bottom mounted instrumentation nozzles are typically 30 feet or more beneath the water surface. As a result, any work from within the vessel requires remote tooling designed specifically for this underwater environment. Any repair that breaches the reactor pressure vessel pressure boundary must include provisions to mitigate loss of the primary water inventory since any loss of primary coolant inventory will directly affect plant safety. Welded repairs to the bottom mounted instrumentation nozzles/J-welds must deliver code acceptable weld quality unaffected by the presence of water. Other welding challenges include the need for temperbead welding (where applicable) to avoid requirements for post weld heat treatment when welding directly to the low alloy steel reactor pressure vessel or welding on the cladding within one-eighth inch (0.32 cm) of the low alloy steel reactor pressure vessel shell, the need for welding to the existing alloy 600 buttering (immediately adjacent to the J-weld) or the need for welding to the cladding (cladding is a nonstructural weld that requires additional evaluation/testing in order to be considered structural). Thus, the need exists for a method for the removal of the existing bottom mounted instrumentation nozzle and all or portions of the J-weld, and the welded installation of a replacement bottom mounted instrumentation nozzle or plug constructed from a crack-resistant nickel alloy.

SUMMARY

These and other objectives are achieved by a method of repairing a bottom mounted instrumentation nozzle for a radioactive reactor vessel that is filled with water and has the reactor internals removed and that may or may not have an in-core instrument tube connected to the bottom-mounted instrumentation nozzle below the reactor vessel. The method includes the steps of installing a plug within or over the bottom-mounted instrumentation nozzle in a manner that prevents the water in the reactor vessel from leaking to any significant extent through the bottom-mounted instrumentation nozzle and then severing the bottom-mounted instrumentation nozzle from the in-core instrument tube below the plug. An external container is then sealed over the bottom-mounted instrumentation nozzle and against the underside of the reactor vessel to create a substantially leak-tight seal between the external container and the bottom of the reactor vessel. The weld between the reactor vessel and the bottom-mounted instrumentation nozzle is then removed and an upward force is applied to the bottom-mounted instrumentation nozzle to remove the bottom-mounted instrumentation nozzle from a through opening in the bottom of the reactor vessel. A new bottom-mounted instrumentation nozzle or plug is then inserted through the through opening in the bottom of the reactor vessel and sealably attached to the bottom of the reactor vessel. The in-core instrument tube is then reattached to the bottom-mounted instrumentation nozzle when a plug is not employed.

In one embodiment, the new bottom-mounted instrumentation nozzle or plug is constructed with an integral shoulder that is configured to be welded to an upper inner surface on the bottom of the reactor vessel. Preferably, the upper inner surface on the bottom of the reactor vessel surrounding the through opening or the shoulder on the new bottom-mounted instrumentation nozzle (or both) is machined to match the contour of the other.

In another embodiment, the step of sealing an external container over the bottom-mounted instrumentation nozzle includes the step of pressuring a seal on an upper lip of the external container against the bottom of the reactor vessel by leveraging the container off of a structural member in the reactor cavity in which the reactor vessel is supported or off of other adjacent bottom-mounted instrumentation nozzles. Desirably, the seal on the lip of the external container comprises one or more O-ring seals, and may incorporate a leak-off line between O-ring gaskets to monitor for leaks. Preferably, the external container includes a drain. The external container may also include a mechanical or hydraulic jack supported within the interior of the external container and configured to apply the upward force to the bottom-mounted instrumentation nozzle. Desirably, the mechanical or hydraulic jack is remotely operated.

BRIEF DESCRIPTION OF THE DRAWINGS

A further understanding of the invention can be gained from the following description of the preferred embodiments when read in conjunction with the accompanying drawings in which:

FIG. 5 is the cross sectional view shown in FIG. 4 with the bottom mounted instrumentation nozzle removed;

FIG. 6 is the cross sectional view shown in FIG. 5 with a new bottom mounted instrumentation nozzle inserted within the through opening in the bottom wall of the reactor vessel;

DESCRIPTION OF THE PREFERRED EMBODIMENT

Figure 1:
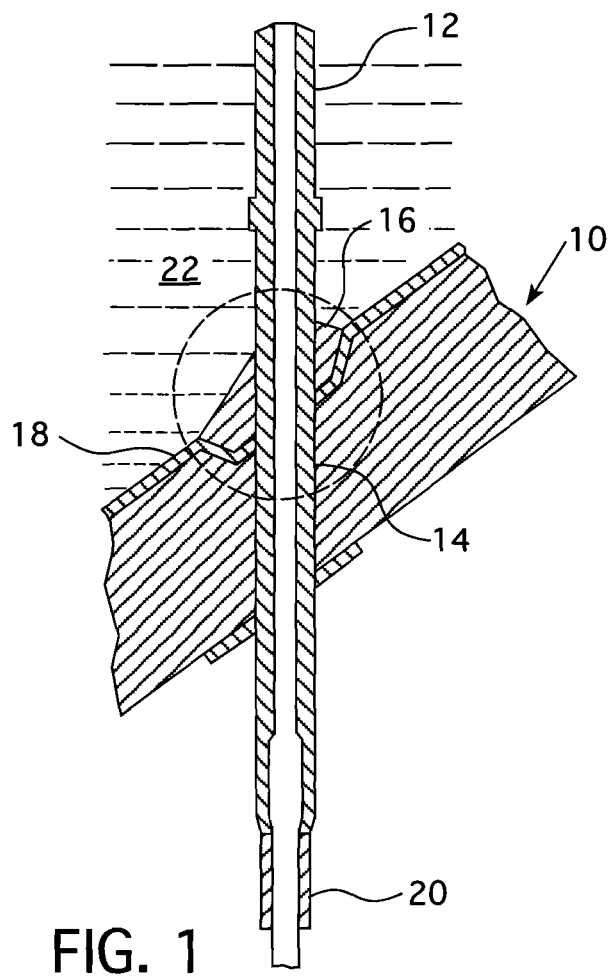
FIG. 1 is a cross sectional view of a portion of the hemispherical lower end of a reactor vessel with a bottom mounted instrumentation nozzle extending through a through hole in the reactor vessel bottom wall.

FIG. 1 shows a cross sectional view of a typical configuration for an existing bottom mounted instrumentation nozzle. The circled area constitutes the original alloy 600 weld (J-weld) 16 used to attach the bottom mounted instrumentation nozzle 12 to the reactor pressure vessel 10 with the bottom mounted instrumentation nozzle extending through a through opening 14 in the bottom of the reactor pressure vessel. This weld, and the bottom mounted instrumentation nozzle itself, are crack susceptible materials requiring repair or replacement. Note that the area inside the vessel, (i.e., around and above the bottom mounted instrumentation nozzle) is water filled, represented by reference character 22. Also note, that the bottom of the bottom mounted instrumentation nozzle 12, external to the reactor pressure vessel 10, may or may not be attached to a stainless steel in-core instrument tube 20. This tube 20 enables in-core instrumentation to be inserted into the reactor core via the bottom mounted instrumentation nozzle, enabling radiation level measurements from within the reactor core during plant operation.

Figure 2:
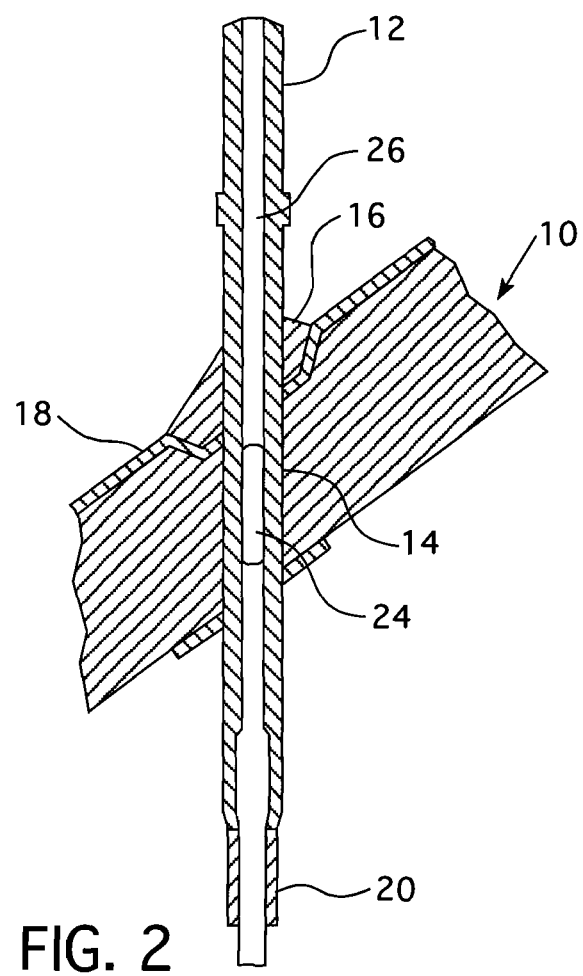
FIG. 2 is the cross sectional view shown in FIG. 1 with a mechanical plug inserted within the central opening within the bottom mounted instrumentation nozzle.

FIG. 2 shows a cross sectional view of the first step of this method of replacing the bottom mounted instrumentation nozzle in which a mechanically expanded plug 24 is inserted into the central opening 26 in the bottom mounted instrumentation nozzle 12 to seal off the opening 26. The bottom mounted instrumentation nozzle bore 26 constitutes a leak path that requires closure to prevent reactor coolant system leakage during the repair operation. Alternatively, a cap can be installed at the top of the bottom mounted instrumentation nozzle to seal off this path.

Figure 3:
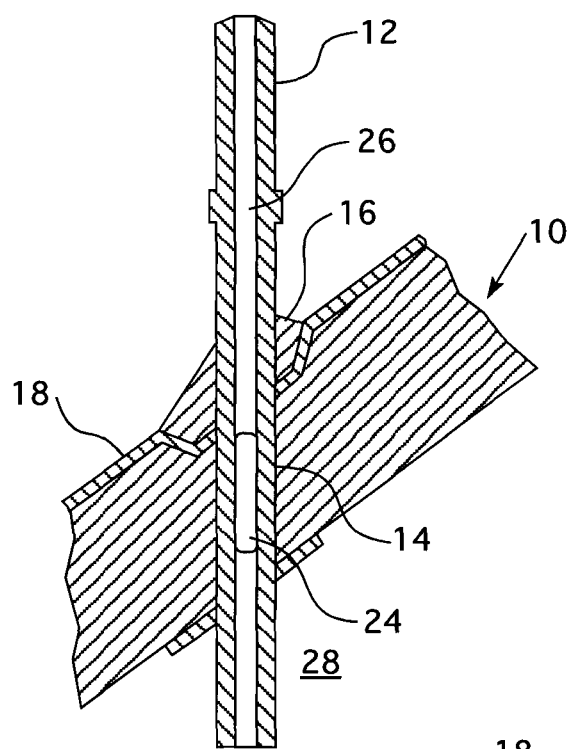
FIG. 3 is the cross sectional view shown in FIG. 2 with the flexible in-core instrument tube cut away from the bottom mounted instrumentation nozzle.

FIG. 3 shows the bottom mounted instrumentation nozzle 12 after it has been severed from the in-core instrument tube 20 (shown in FIG. 2). This severing operation is accomplished using tooling that is placed in the in-core instrumentation pit 28 beneath the reactor pressure vessel 10, which has very high radiation levels. Upon severing the in-core instrument tube 20, the plug 24, previously placed in the bottom mounted instrumentation nozzle, prevents leakage of the reactor coolant system water into the in-core instrumentation pit 28. The severed portion of the bottom mounted instrumentation nozzle 12, and the corresponding in-core instrument tube 20 (which is a flexible assembly shown in FIG. 2), is moved away from the work location, where the end of the in-core instrumentation tube 20 can be prepped for re-welding later in the repair process.

Figure 4:
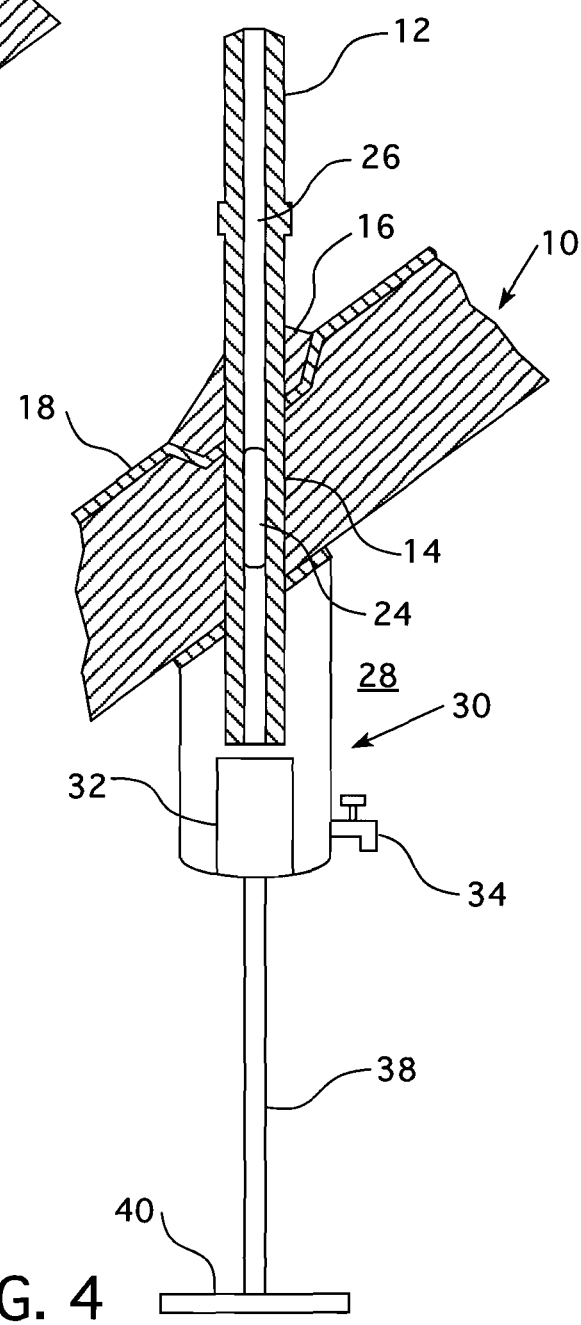
FIG. 4 is the cross sectional view shown in FIG. 3 with an external can seal applied over the lower end of the bottom mounted instrumentation nozzle and sealed to the underside of the reactor vessel and supported from the bottom of the reactor vessel cavity.

FIG. 4 shows the external container 30 that is employed in the next step of the repair process. This external container 30 is placed outside and under the bottom of the reactor pressure vessel, and the open end of the container is placed over the bottom mounted instrumentation nozzle with the open end in intimate contact with the outer bottom surface of the reactor pressure vessel 10. The open end of the external container 30 forms the mating interface with the reactor pressure vessel, and includes an integral seal gasket at the interface to prevent leakage. The container is held in place by a supporting device/structure 38 that exerts a mechanical force on the mechanical seal/vessel interface. The force can be created by supporting and leveraging the external container 30 from the floor 40 of the reactor cavity in which the reactor vessel 10 is supported as shown, from another structural member within the reactor cavity or from adjacent bottom-mounted instrumentation nozzles. The external container 30 includes a drain assembly 34 and an integral jacking device 32, preferably a mechanical or hydraulic jack, that is housed within the container 30, but is operated by external controls, as figuratively illustrated by control cable 36 (FIG. 5). The jack 32 is located between the bottom end of the bottom-mounted instrumentation nozzle 12 and the bottom inside surface of the external container 30. Since the bottom mounted instrumentation nozzle 12 fits tightly into the reactor pressure nozzle penetration 14, the mechanical jacking force is used to push the bottom-mounted instrumentation nozzle 12 up through the penetration 14, facilitating extraction.

FIG. 5 shows the resulting configuration after removal of the existing bottom-mounted instrumentation nozzle 12. Removal of existing bottom mounted instrumentation nozzle 12 is accomplished as follows: First, metal is removed, either by a mechanical metal removal process such as grinding or cutting or by electrical discharge machining, or by a combination of these and other metal removing methods to sever the existing bottom mounted instrument/J-weld from the reactor pressure vessel 10. The excavation removes all or a portion of the existing J-weld. The excavation contour is uniquely designed to accept and accommodate the replacement bottom mounted instrumentation nozzle. In one embodiment a mechanical force is then applied preferably to the bottom of the bottom mounted instrumentation nozzle via the jacking device 32 contained within the enclosure 30. This force ejects the bottom mounted instrumentation nozzle 12 from the through hole 14 through the bottom wall of the reactor vessel 10. However, other means of applying a force sufficient to remove the bottom nozzle may also be used. The old bottom-mounted instrumentation nozzle is then extracted from the reactor pressure vessel. The jacking device 32 is retracted, to enable installation of the replacement bottom-mounted instrumentation nozzle.

Figure 7:
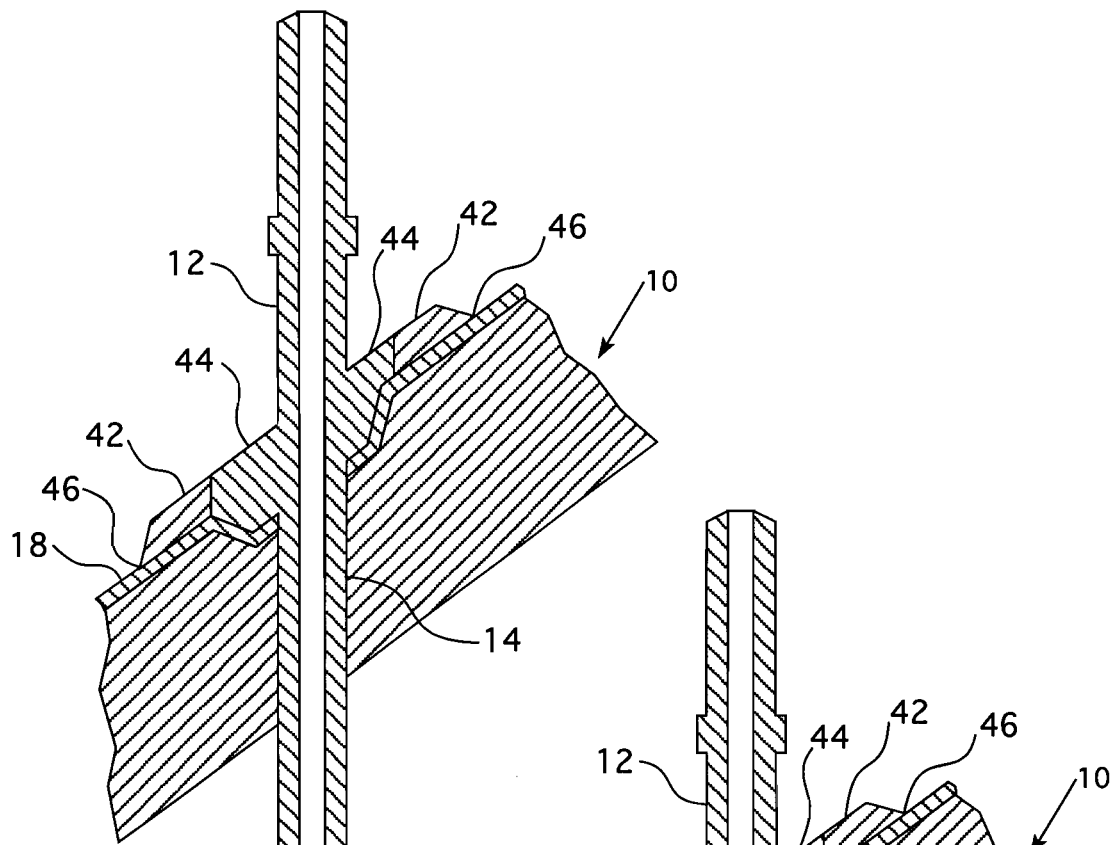
FIG. 7 shows a portion of the cross sectional view shown in FIG. 6 with the new bottom mounted instrumentation nozzle welded in place.

FIGS. 6 and 7 show the replacement nozzle installed in the penetration 14. FIG. 6 shows the nozzle 12 ready for welding, and FIG. 7 shows the nozzle welded in place with the weld 42 shown on either side. The replacement nozzle 12 incorporates an integral shoulder 44, custom manufactured to match the excavation contour in the reactor pressure vessel 10. Once placed into this excavation, the replacement bottom-mounted instrumentation nozzle is aligned and welded in place, using a weld designed for the specific application. Welding may use the temperbead welding process, or optionally may avoid temperbead by attaching to either (or both) the existing alloy 82/182 buttering 46 or to the stainless steel vessel cladding 18. The length and shape of the integral shoulder 44 may be varied to ensure the weld is installed on the optimum location on the vessel/buttering/cladding. The weld is designed to enable nondestructive examination, including pre-weld, in-process, final and in-service nondestructive examination. The replacement nozzle 12 is installed with a removable mechanical plug or cap (which may be similar to the plug/cap installed on the old bottom-mounted instrumentation nozzle) that, as in FIG. 2, serves to temporarily prevent leakage. Alternatively, the bottom-mounted instrumentation nozzle may be replaced with a bottom-mounted instrumentation plug of similar configuration, but without the need for an internal plug or cap, and without the need for reattachment of the in-core instrument line.

Figure 8:
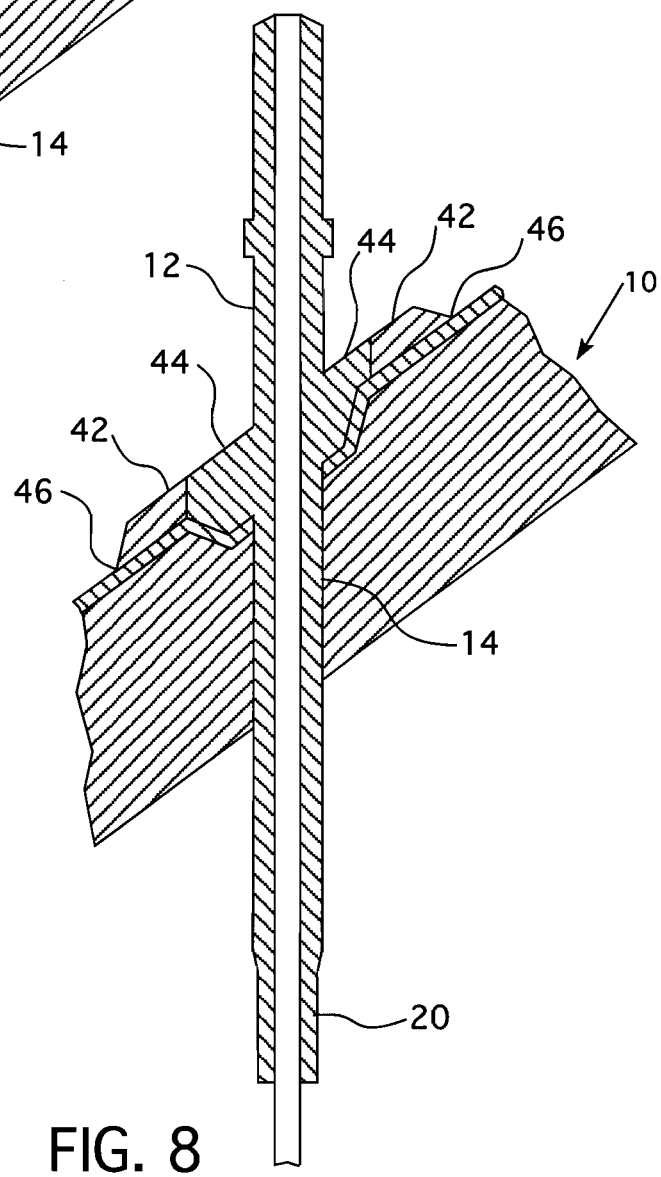
FIG. 8 is an enlargement of the cross sectional view shown in FIG. 7 with the external container seal removed.

After final acceptance of the replacement weld, the external enclosure 30 is removed. Once the external enclosure is removed, the bottom of the replacement bottom mounted instrumentation nozzle is exposed, and the in-core instrument tube 20 is reattached by welding. After the in-core instrument line reattachment, the internal plug/cap is removed from the replacement bottom-mounted instrumentation nozzle. At this point, the replacement operation is completed as shown in FIG. 8 and the reactor pressure vessel can be returned to service. As a result of this replacement, all crack susceptible materials have been removed from service, and the replacement bottom-mounted instrumentation nozzle or bottom-mounted instrumentation plug will provide acceptable service for the life of the plant.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of repairing a bottom-mounted instrumentation nozzle for an irradiated reactor vessel that is filled with water and has the reactor internals removed and an in-core instrument tube connected to the bottom-mounted instrumentation nozzle below the reactor vessel, comprising the steps of:
   installing a plug within or over the bottom-mounted instrumentation nozzle in a manner that prevents the water in the reactor vessel from leaking to any significant extent through the bottom-mounted instrumentation nozzle;
   severing the bottom-mounted instrumentation nozzle from the in-core instrument tube below the plug;
   sealing an external container over the bottom-mounted instrumentation nozzle and against an underside of the reactor vessel to create a substantially leak tight seal between the external container and a bottom of the reactor vessel;
   removing at least a portion of a weld between the reactor vessel and the bottom-mounted instrumentation nozzle;
   applying an upward force on the bottom-mounted instrumentation nozzle to remove the bottom-mounted instrumentation nozzle from a thru-opening in the bottom of the reactor vessel;
   inserting a new bottom-mounted instrumentation nozzle through the thru-opening in the bottom of the reactor vessel or a new bottom-mounted instrumentation nozzle plug into the thru-opening in the bottom of the reactor vessel; and
   sealably attaching the new bottom-mounted instrumentation nozzle or the bottom nozzle instrumentation plug to the bottom of the reactor vessel.

2. The method of repairing the bottom-mounted instrumentation nozzle of claim 1 wherein the bottom-mounted instrumentation nozzle is being replaced with the new bottom-mounted instrumentation nozzle including the step of attaching the in-core instrument tube to a bottom end of the new bottom-mounted instrumentation nozzle.

3. The method of repairing the bottom-mounted instrumentation nozzle of claim 1 wherein the new bottom-mounted instrumentation nozzle or the bottom nozzle instrumentation plug is constructed with an integral shoulder that is configured to be welded to the bottom of the reactor vessel.

4. The method of repairing the bottom-mounted instrumentation nozzle of claim 3 wherein either an upper surface on the bottom of the reactor vessel surrounding the thru-opening or the shoulder on the new bottom-mounted instrumentation nozzle or bottom nozzle instrumentation plug is machined to match the contour of the other of either the upper surface on the bottom of the reactor vessel surrounding the thru-opening or the shoulder on the new bottom-mounted instrumentation nozzle or bottom nozzle instrumentation plug.

5. The method of repairing the bottom-mounted instrumentation nozzle of claim 1 wherein the step of sealing an external container over the bottom-mounted instrumentation nozzle includes pressuring a seal on a lip of the external container against the bottom of the reactor vessel by leveraging the external container off of a structural member in a bottom of a reactor cavity in which the reactor vessel is supported or off of other bottom-mounted instrumentation nozzles.

6. The method of repairing the bottom-mounted instrumentation nozzle of claim 5 wherein the seal comprises a double concentric O-ring seal that comprises two O-ring gaskets.

7. The method of repairing the bottom-mounted instrumentation nozzle of claim 6 including a leak-off line between the O-ring gaskets to monitor for leaks.

8. The method of repairing the bottom-mounted instrumentation nozzle of claim 1 wherein the external container includes a drain.

9. The method of repairing the bottom-mounted instrumentation nozzle of claim 1 wherein the external container includes a mechanical or hydraulic jack supported within the interior of the external container and configured to apply the upward force to the bottom-mounted instrumentation nozzle or the bottom nozzle instrumentation plug.

10. The method of repairing the bottom-mounted instrumentation nozzle of claim 9 wherein the mechanical or hydraulic jack is remotely operated.

11. A method of repairing a sealed penetration through a pressure vessel filled above the penetration with a liquid comprising the steps of:
    installing a plug within or over the penetration in a manner that prevents the liquid in the pressure vessel from leaking to any significant extent through the penetration;
    sealing an external container over the penetration and against an outside of the pressure vessel to create a substantially leak tight seal between the external container and outside of the pressure vessel;
    removing at least a portion of a weld between the pressure vessel and the penetration;
    applying a force on the penetration to remove the penetration from a thru-opening in the pressure vessel;
    inserting a new penetration through the thru-opening in the pressure vessel or a plug into the thru-opening in the pressure vessel; and
    sealably attaching the new penetration or plug to the pressure vessel.

12. The method of claim 11 wherein the step of applying the force removes the penetration from the thru-opening into the pressure vessel.

13. The method of claim 11 wherein the new penetration or plug is constructed with an integral shoulder that is configured to be welded to the pressure vessel.

14. The method of claim 13 wherein either a mating surface on the pressure vessel surrounding the thru-opening or a mating surface on the shoulder is machined to match the contour of the other.

15. The method of claim 11 wherein the step of sealing an external container over the penetration includes pressuring a seal on a lip of the external container against the bottom of the reactor vessel by leveraging the external container off of an adjacent structural member.

16. The method of claim 15 wherein the seal comprises a double concentric O-ring seal that comprises two O-ring gaskets.

17. The method of claim 16 including a leak-off line between the O-ring gaskets to monitor for leaks.

18. The method of claim 11 wherein the external container includes a drain.

19. The method of claim 11 wherein the external container includes a mechanical or hydraulic jack supported within the interior of the external container and configured to apply the force to the penetration.

20. The method of claim 19 wherein the mechanical or hydraulic jack is remotely operated.

\* \* \* \* \*